Figure 1:
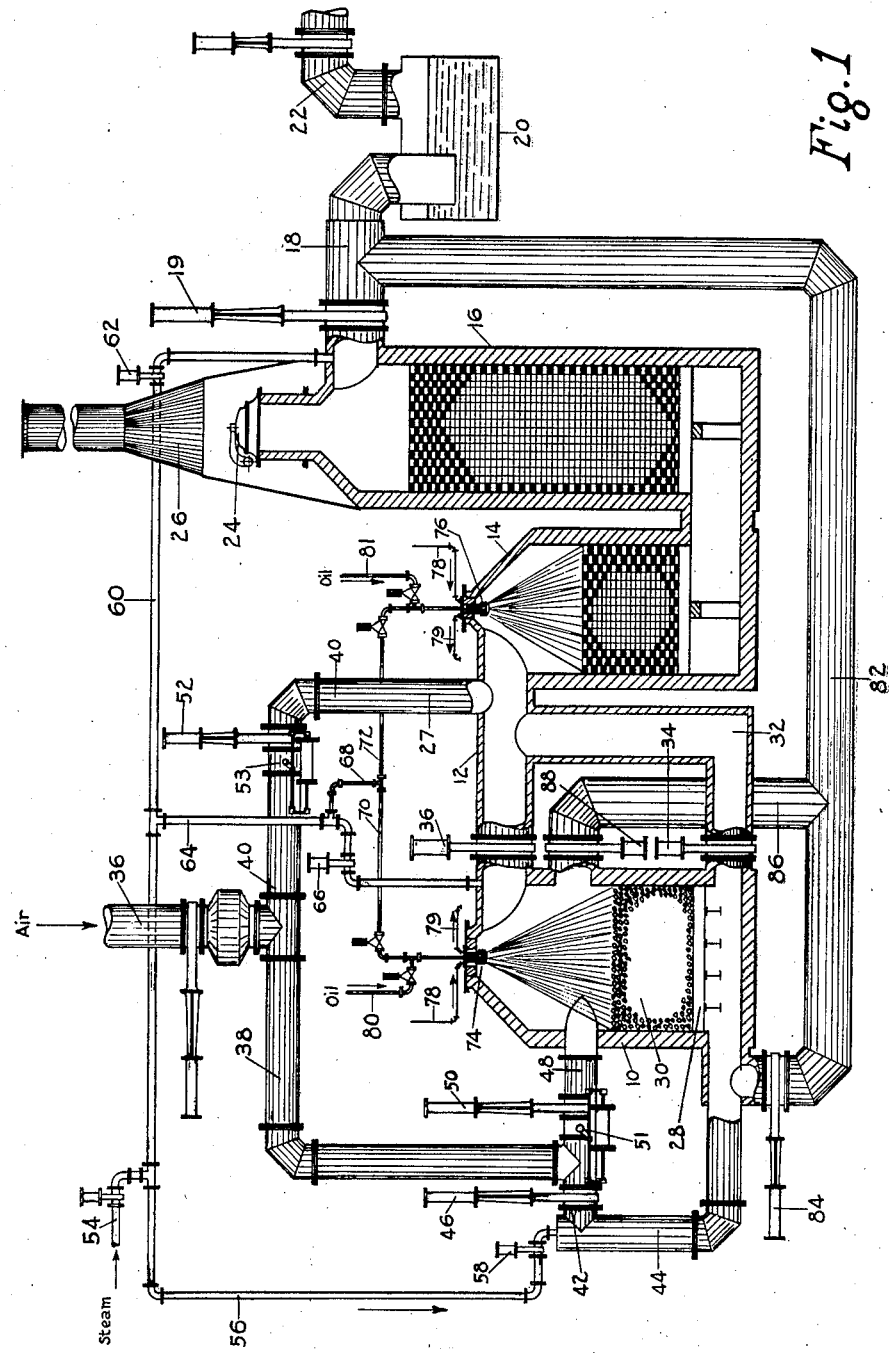

June 2, 1936.                A. JOHNSON                2,042,997
                         OIL GASIFICATION PROCESS
                         Filed Sept. 5, 1931        2 Sheets-Sheet 1

INVENTOR
ALFRED JOHNSON
BY Edmund G. Borden
ATTORNEY

June 2, 1936.   A. JOHNSON   2,042,997
OIL GASIFICATION PROCESS
Filed Sept. 5, 1931   2 Sheets-Sheet 2

INVENTOR
ALFRED JOHNSON
BY
ATTORNEY

Patented June 2, 1936

2,042,997

UNITED STATES PATENT OFFICE 2,042,997

OIL GASIFICATION PROCESS

Alfred Johnson, West New Brighton, N. Y., assignor to Combustion Utilities Corporation, New York, N. Y., a corporation of Maine Application September 5, 1931, Serial No. 561,354

7 Claims. (Cl. 48—214)

This invention relates to oil gasification, and more particularly it concerns a process and apparatus for the production from hydrocarbon oil or oils of a combustible gas of preselected heating value and specific gravity adapted for use for the usual industrial and domestic purposes.

In the preferred practice of the invention, a slightly modified standard water gas set construction is employed, although the details of construction of the respective elements of the apparatus may be substantially varied, as hereinafter indicated.

Processes are already known by which oil-gas or a mixture of oil gas and water gas is produced by cyclic processes involving a step of spraying oil upon a highly-heated bed of solid fuel in a gas generator. Such processes are extremely difficult to control, both with regard to the maximum temperature attained and the degree of uniformity of heat distribution through the bed. Extremely high temperatures are developed within the coke fuel bed, resulting at such points in clinker formation which seriously interferes with the uniformity of heat distribution and makes necessary frequent shut-downs for cleaning out the mass of clinkers and for adjusting the bed to provide for the uniform free passage of air throughout its entire cross-section.

Other processes have been employed involving the cracking of oil by spraying it upon highly heated checker-bricks within a gas generator for the purpose of making carbon black and hydrogen. In such cases the checker bricks merely serve as a means for imparting to the hydrocarbon the heat necessary to crack the same and to produce a desired products. This heat in most instances is previously imparted to the checker bricks by burning other portions of the oil or hydrocarbon with air within the generator in a preceding cycle. The checker brick obviously has no function as a screen or filter for the carbon black; and in fact, if it possessed that function, would fail to produce carbon black of a merchantable quality suitable for the usual purposes. In such processes a considerable portion of the carbon content of the hydrocarbon oil employed is lost by its combustion for heating the checker brick. It is extremely difficult and costly to regenerate the major portion of the sensible heat of the combustion gases thus produced, much of which is lost through the stack.

Among the more important objects of the present invention are:

To provide, in a process for the manufacture of a combustible gas from oil, for supplying all the heat requirements of the process by the controlled combustion of carbon produced by the cracking of the oil employed in the process; to provide a process of oil gasification according to which no oil is directly burned with air or oxygen in a heating cycle for the production of heat; to provide a balanced flexible system for the manufacture of combustible gas whereby a gas of the desired heating value and specific gravity can be uniformly produced in a cyclic process; to provide in an oil gasification process for the even distribution of heat throughout a refractory bed or screen within a gas generator during an air blast cycle; and to provide a novel process and apparatus for the production of a combustible gas in which the heat during a blast cycle is efficiently generated from carbon produced in an earlier gas-making cycle.

In its broadest sense, the invention involves the blasting of air or its equivalent through a bed or screen of selectively-sized refractory bodies within a gas generator, under carefully selected conditions adapted to consume effectively the carbon deposited upon and in the said bed during a previous gas making run. The heat developed during the blasting operation is then employed for heating the carburetor and superheater of a water gas set and supplies the heat necessary for carburetion of a mixed water-gas-oil-gas produced in the generator during a subsequent gas making step, and for superheating steam used at such time.

For uniformly distributing heat to a refractory screen or bed, the usual method of blasting air upwardly as in the case of a generator fuel bed has proven inadequate, where relatively small amounts of carbon and large amounts of refractory material are present as in the refractory screen of the present invention. Such up-blasting when used alone quickly cools the lower portions of the refractory screen and effects stoppage of operation. An extremely high temperature zone develops adjacent the top of the refractory bed, while the bottom quickly has its carbon burned away and its temperature thereafter falls.

The present invention is based in important part upon the discovery that it is possible to catch upon a suitable, highly heated refractory screen within a generator, sufficient carbon formed thereon by the cracking of hydrocarbon oil, to supply all of the heating requirements for gasification of the oil,—providing that the refractory body or screen is successively blasted upwardly and then downwardly,—or downwardly and then upwardly,—for suitable periods of time, to effect uniform heat distribution therethrough.

The general tendency for a rising hot zone to exist in any up-blast system is readily counteracted by the additional down-blast cycle which helps to carry heat down into the refractory bed. Thus it has been found possible to maintain the top of the refractory screen at a high oil-cracking temperature.

The heat carried into the upper part of the refractory bed during the up blast more than offsets any cooling effect there of the air introduced during the down blast cycle.

Because of the uniformity of high temperature heat control effected by the successive blasting cycles, there is a much larger amount of carbon deposited in the refractory screen when employing the up-and down-blast cycles in conjunction with each other than where the up-blast alone is used. This means a more efficient thermal decomposition of the hydrocarbons and a larger yield of valuable combustible gases.

Figure 2:
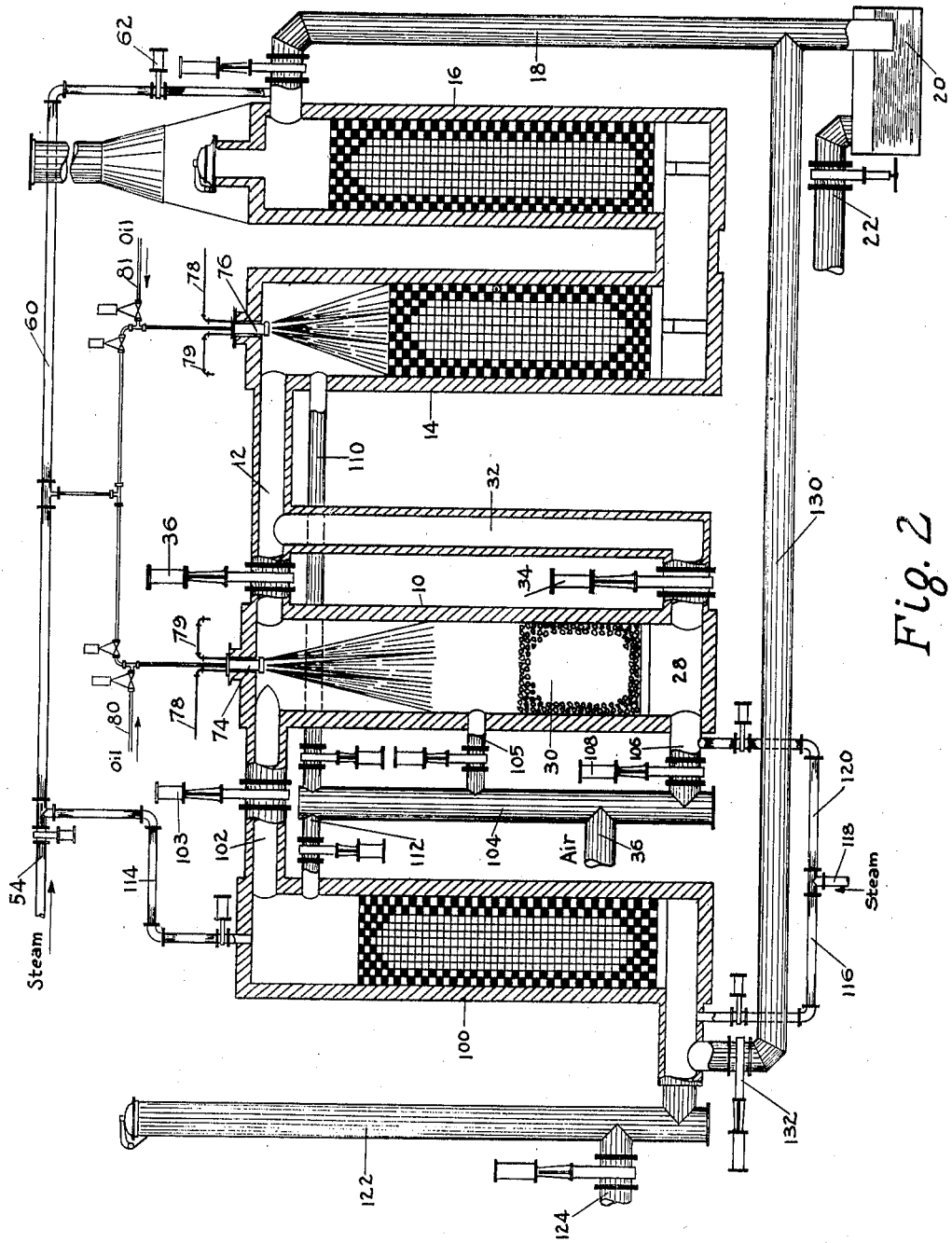

In the accompanying drawings which illustrate certain preferred forms of apparatus embodying features of the present invention;

Fig. 1 is a somewhat diagrammatic view in vertical section of a slightly modified standard water gas set embodying features of the invention; and Fig. 2 is a somewhat diagrammatic view in vertical section of a modified form of gas-making apparatus embodying the invention.

Referring now to Fig. 1, numeral 10 designates a gas generator of well known type, connected at its top through conduit 12 with a carburetter 14. The latter is connected at its base with superheater 16. A conduit 18, controlled by valve 19, connects the upper portion of superheater 16 with a wash box 20, with the latter of which a valve-controlled gas offtake line 22 also communicates.

The top of superheater 16 has a hinged closure or snift valve opening into a stack 26, waste heat boiler, or other point of blast-gas discharge.

The generator 10 has therein a grate 28 upon which is supported a bed or screen 30 of considerable depth composed of refractory material, which depth will vary from around 2 ft. upwardly depending upon the conditions of operation, such as the temperatures and the like desired to be maintained in the refractory screen.

The refractory material is preferably sized to around 1¼ or 1½ inch pieces. Sizes of ¾ inch and upward have given satisfactory service.

Since temperatures as high as 2800° F. are developed in the refractory bed, the material composing the refractory screen is preferably irregularly shaped pieces of high alumina fire brick or other refractories such as carborundum, pure alundum, and high silica brick, adapted to withstand temperatures above 3000° F.

The lower part of the generator 10 below the grate is connected with the conduit 12 through the line 32 controlled by valve 34. Likewise a valve 36 is disposed in the line 12 between the generator and the line 32.

For introducing air for combustion into the generator and carburetter, a valve-controlled main air header 36 is provided, having the respective branch lines 38 and 40. The branch line 38 is in communication with the generator below the grate 28 through conduits 42 and 44, under control of a valve 46. The branch air line 38 is in controlled communication with the generator above the top of the refractory screen therein through the conduit 48 controlled by valve 50, and by a hydraulically-controlled damper 51.

The branch air line 40, controlled by the valve 52, and the hydraulically-controlled damper 53, is connected with conduit 12 at or adjacent the carburetter 14.

The dampers 51 and 53 are so interconnected and operated that during an up-blast cycle a selected portion of the secondary air employed is introduced into the generator through conduit 48, and the balance of the secondary air is introduced into the carburetter through line 40; whereas in the down-blast cycle, all of the secondary air is introduced into the blast gases through line 40. However, if desired, secondary air may be introduced into the base of the generator through line 44 during the down-blast cycle.

For the purpose of supplying steam to the various elements of the gas-making set there is provided a valve-controlled main steam line 54 having a branch line 56 controlled by a valve 58, and a branch line 60 controlled by a valve 62. Line 56 communicates with the air conduit 44; and the steam line 60 is connected with the upper end of the superheater 16.

A branch steam line 64, controlled by a valve 66, directs the flow of steam from the main steam header 54 to the upper part of the generator 10. A smaller steam line 68 connects the line 64 through the valve-controlled branch lines 70 and 72 respectively with an oil spray nozzle 74 in the generator 10, and with an oil spray nozzle 76 in the carburetter 14. Each of the said spray nozzles is provided with a water jacket and with means including inlet and outlet water lines 78 and 79 for circulating cooling water around each nozzle. Valve-controlled oil lines 80, 81 communicate respectively with the spray nozzles 74 and 76. A rich gas offtake conduit 82, controlled by valve 84, connects the lower part of the generator below the grate with the conduit 18 adjacent the wash box. A branch rich gas offtake 86, controlled by valve 88, connects the offtake line 82 with the generator 10 above the top of the refractory screen therein.

In the modification of the invention illustrated in Fig. 2, the respective generator and carburetter are somewhat taller than in the corresponding units of the modified standard water gas set shown in Fig. 1. In most respects the features of construction shown in Fig. 2 are similar to those of Fig. 1,—with certain exceptions. In Fig. 2, the upper end of the generator 10 is in controlled communication with a regenerator or steam superheater 100 through a conduit 102 controlled by a valve 103. Conduit 102 opens tangentially into the generator 10 in the manner shown. In this figure the main air line 36 is connected through a conduit 104 respectively with a valve-controlled conduit 105 and with a conduit 106, the latter of which leads to the base of the generator 10 and is controlled by valve 108.

The air conduit 104 is connected through the valve-controlled line 110 with the upper portion of the carburetter 14; and it also is connected through the valve-controlled conduit 112 with the upper portion of the superheater 100.

In this second modification a valve-controlled branch steam line 114 connects a steam header 54 with the top of the regenerator 100. A valve-controlled branch line 116 leads from a second steam header 118 to the base of the regenerator 100. A second valve-controlled branch line 120 connects the steam line 118 with the base of the generator 10. The lower part of the regenerator 100 is connected with a stack 122 having connected therewith a valve-controlled line 124 leading to a waste heat boiler or the like. A rich gas offtake line 130, controlled by a valve 132, establishes controlled communication between the base of the regenerator 100 and the wash box 20. Other elements of construction are similar to those of Fig. 1.

In the practice of the invention with the modified standard water gas set shown in Fig. 1,—a series of cycles including the following is preferably employed, although the respective up-blast and down-blast cycles may be interchanged if desired, as is subsequently pointed out. Assuming that an oil gas-making cycle has been completed and that the refractory screen 30 now contains a substantial quantity of carbon deposited in and on it, the necessary valves are adjusted to permit a flow either of air alone or of air more or less saturated with steam into the base of the generator through conduit 44. The air in passing up through the highly heated refractory screen reacts with the carbon held by the latter, thus producing blast gases, the carbon dioxide content of which is rapidly reduced to carbon monoxide during passage of the blast gases through the screen so that the first portion of the blast gases leaving the refractory screen is relatively rich in carbon monoxide. If extremely high blasting rates are used, blast products will be somewhat poorer at this stage, due to such high velocities. During this blast cycle, secondary air is introduced into the generator above the screen, through air conduit 40 for burning in the generator selected portions of the blast gases. The blast products flow from the generator and are completely burned in the carburetter by secondary air introduced therein from branch line 40. The resultant sensible heat serves to highly heat the checker bricks of the carburetter 14 and of the superheater 16. From the latter the blast gases flow through the snift valve 24 to the stack or to a waste heat boiler, as in the usual practice.

After the up-blast air cycle has continued for a sufficient length of time for burning the carbon from the refractory material in the lower part of the refractory screen, the air supply through line 44 is discontinued and a short down steam purge is effected in the generator by steam introduced therein through the steam line 64,—the valve 36 being closed and valve 34 open. Following the down steam purge, valve 50 is opened to admit air into the generator above the refractory screen, and combustion of the remaining carbon in the highly heated screen is effected during passage downwardly of the air therethrough. The blast gases flowing from the lower part of the refractory screen are preferably burned entirely with secondary air flowing through conduit 40 to the carburetter, although they may be burned in part with secondary air flowing to the generator from conduit 44. The blast gases pass through conduit 32 to the carburetter and superheater, and from the latter the cooled gases flow to the stack or waste heat boiler.

After the down air blast has been continued for the length of time required to consume the carbon in the refractory screen and to bring the same to a uniform high temperature adapted to produce a gas of the desired characteristics, flow of the air to the generator through line 48 is discontinued,—and a short up-steam purge is effected by steam introduced into the generator through the lines 56 and 44,—the valve 34 being closed and the valve 36 being opened.

The apparatus is now ready for the gas-making run,—the refractory screen of the generator as well as the checker brick of the carburetter and superheater being at high temperatures. A mixture of steam and oil is now introduced into the generator through the nozzle 74, supplemented if desired by additional steam flowing thereto through steam line 64. The nozzle 74 effects a thorough distribution of the oil upon the upper surface of the refractory screen where rapid thermal decomposition of the oil begins,—part of the carbon thus formed being in the form of a lampblack like material and part being of a pitchy or coke-like nature. Evidently considerable carbon is caught on the refractory screen by a form of straight mechanical filtration, although on the whole, filtration appears to be a less important factor than is that of temperature attained in determining the carbon location in the screen. Cracking of oil vapors is largely a surface reaction; and the greatest carbon deposition occurs where the temperature is highest. It is doubly important therefore that uniform high temperatures be maintained in the refractroy screen in order to obtain a suitable uniformly distributed deposit of carbon on and through the screen. This is accomplished effectively by the successive blast cycles described above.

The mixed hydrocarbon gases and water gas flow from the base of the generator through conduit 32 to the carburetter where they encounter a spray of hydrocarbon oil; and the thus-carburetted mixed gases are fixed as they flow through the highly heated carburetter and superheater. From the latter, they flow through the wash box to the gas main 22.

The oil introduced into the carburetter through nozzle 76 is preferably of a lighter gravity than that employed in the generator. For instance, gas oil may be effectively used in both the generator and carburetter, although it is preferred to use in the former a heavier oil such as one having an A. P. I. gravity of 12° to 18.5°. Hydrocarbon oils of the gravity of fuel oil or still heavier hydrocarbons are well adapted for use in the generator.

Following completion of the down-run gas-making cycle, an up-purge with steam is employed, the steam being introduced below the grate of the generator through conduits 56 and 44. The purge gases are conducted to the gas main through the carburetter and superheater, conduit 18, and the wash box 20. The above-mentioned series of cycles is then repeated.

In instances where it is desired to utilize the generator of the invention alone, without the carburetter and superheater,—the operation of the generator is the same as described above, excepting that the blast gases leaving the generator may be passed directly from the generator through a suitable outlet, to a waste heat boiler or the like, for heat regeneration purposes; and the combustible gases produced in the gas making cycle will then be conducted directly from the generator to the holder through conduit 82.

In the preferred practice of the invention employing the modified apparatus shown in Fig. 2, the series of cycles are the same as those above described with the exception of the up-blast cycle. With respect to the up-blast cycle, the highly heated blast gases flowing upwardly from the refractory screen are divided at the top of the generator,—a selected portion thereof flowing to the carburetter 14 and superheater 16 in the manner previously described. Another selected portion of these hot blast gases flows into and downwardly through the regenerator 100, and thence out through the stack 122 or through conduit 124 to a waste heat boiler. The heat recovered in the regenerator 100 from these blast gases is subsequently used for superheating steam to be used in conjunction with the oil admitted into the top of the generator. In this instance the steam to be superheated enters the regenerator 100 through the conduit 116, thence flowing through the regenerator and downwardly into the generator together with the oil spray or oil-steam spray introduced through nozzle 74.

It is within the scope of the present invention to reverse the order of the down-blast and up-blast cycles through the refractory screen of the generator so as to employ the down-blast cycle first. Such an arrangement is very effective for maintaining a high temperature in the top of the refractory screen. The partial cooling occurring at the screen top during the latter part of the down-blast is very effectively counteracted by the heat carried upward thereto during the subsequent up-blast.

Carbon deposition upon and within the refractory screen appears to be greater with this arrangement of successive down- and up-blast cycles than with the alternative arrangement. Substantially all of the refractory screen is thereby made highly effective for the cracking of the hydrocarbons and the subsequent collecting of carbon.

For flexibility of control of the process it is desirable to operate with a refractory screen which serves to catch more carbon than is really necessary for heat development purposes. This is made possible by the combination of alternate up-blast and down-blast cycles. The unevenly heated fuel beds or refractory beds resulting from the use of a one-way blast cycle invariably fail to catch a sufficient amount of carbon to insure flexibility of operation and uniform production of a gas of selected characteristics.

In the practice of the invention as above described, the oil gas or oil-gas-water-gas mixture produced may have a heating value varying from below 500 B. t. u. per cubic foot to 1500 or more B. t. u. per cubic foot. The specific gravity of the combustible gases will vary in accordance with the extent of oil cracking, which in turn is controlled by the temperature maintained in the refractory screen during the gas-making cycle and the rate of flow of the gases through the hot refractory screen.

For the purpose of still further increasing the gas making capacity of the generator, and for the purpose of producing a combustible gas of a higher specific gravity than .45, the up-blast cycle as previously described may be modified in the following manner:

A selected portion of the earlier part of the up-blast cycle is so conducted that the blast gases flow unburned through the generator, carburetter and superheater and are conducted through the line 18 and wash box to the gas main 22 and storage. During this phase of the up-blast, no secondary air is introduced into the generator above the refractory screen,—nor is any introduced into the carburetter for effecting secondary combustion of the blast gases. After the desired portion of the blast gases has been conducted to the gas holder, the valve 19 is closed, and the stack valve 24 is opened. The up-blast through the refractory screen is continued for the determined length of time, with secondary air being introduced into the generator through conduit 46 and into the carburetter through conduit 40. Ample heat is thus developed to cause rise in temperature in the generator, carburetter and superheater to those temperatures required in the subsequent gas-making cycle. Following completion of the up-blast cycle, the down steam purge is begun in the manner already described.

In the ordinary practice of the invention, oil and steam are simultaneously introduced into the generator in the gas-making run in predetermined amounts, which may in some instances approximate .3 to .6 of a pound of steam per pound of oil.

Under these conditions a very large volume of combustible gases is produced, with the result that unless the generator and gas offtakes therefrom are designed to accommodate such large volume of gas, the velocity of flow through the refractory screen may become too great for the most efficient operation.

Therefore, in most instances where it is desired to limit the rate of flow of gases through the refractory screen without seriously reducing the efficiency of the process, the gas-making cycle previously described may be modified in the following manner:

Upon the completion of the described up-steam purge, the down-gas making run is begun, employing oil with very little or no steam. The oil is cracked in the usual manner on and in the refractory screen. The carbon is deposited in the manner described; and a mixture of hydrogen and the gaseous lower hydrocarbons concurrently formed flow in the usual manner from the generator through conduit 32 into and through the carburetter 14 and superheater 16. During this stage of operation no carburant is introduced into the carburetter at the nozzle 76. The gas produced flows from the superheater through the wash box to storage.

After continuing such operations for a selected time, dependent upon such conditions as the temperature of the fuel bed and the gravity of the oil, the oil flow to the generator is cut off, valve 34 is closed, and valve 36 is opened. Steam is then introduced into the base of the generator through conduits 56 and 44; and water gas produced by its passage through the highly heated carbon-containing refractory screen flows to the carburetter and superheater,—in the former of which it is carburetted by oil introduced through nozzle 76. The thus-carburetted water gas is fixed during passage through the carburetter and superheater, and thence flows through the wash box to storage. The next succeeding blast cycle is then begun.

The last-named gas-making cycle may be so controlled by adjusting the amount of steam added with oil at the first stage of that cycle as to generate combustible gas in each stage of the gas-making cycle at rates so nearly the same that a balanced approximately uniform rate of flow of gases through the refractory screen is maintained throughout the gas-making cycle at a controlled velocity below the critical velocity for the refractory screen employed.

For further increasing the efficiency of the process, under certain conditions of operation the previously described forward gas-making run may be in part replaced or may be followed by a down-gas making run in the nature of a back run. In employing such back run in conjunction with the forward gas-making run, the valve 19 is closed following the forward run; and then steam is introduced into the superheater 16 through the conduit 60.

This steam is superheated in passing through the superheater and carburetter, no carburant being introduced into the latter during this stage of operation.

The superheated steam reacts in the carburetter with any carburant previously deposited therein by cracking of hydrocarbons during a forward gas-making run. Water gas is thus formed with the removal of the carbon, thus effectively counteracting any tendency toward the clogging of the carburetter with carbon. The water gas thus produced flows with the excess superheated steam into the generator and passes downwardly through the residual carbon on the highly heated refractory screen, producing increased yields of water gas, which then flows from the generator directly through the conduit 82 to the wash box.

If the back-run is desired to be in the nature of an up-run through the refractory screen, valves 36 and 84 are closed, and valves 34 and 88 are opened, the gas produced in the generator then flowing therefrom through conduits 86 and 82 to the wash box. In the practice of the invention as heretofore described, it has been found possible consistently to obtain very large yields of combustible gas having a heating value and a specific gravity which are subject to a ready control throughout the period of operation, and which are uniform in character. The temperature of the refractory screen ranges from 1850° to 3000° F., dependent upon the conditions of operation selected for purposes of such temperature control.

By the practice of the present invention it is possible for the operator to make, at will, from one or more hydrocarbon oils, a combustible gas of preselected heating value and specific gravity within a rather wide range of values, by a process which readily permits temperature control throughout the refractory screen, carburetter and superheater. The maximum temperatures attained are sufficiently low that they may safely be employed in connection with the usual refractory generator set construction. The invention is susceptible of modification within the scope of the appended claims.

I claim:

1. In a cyclic process for making combustible gas wherein during a gas making period hydrocarbons are cracked by passing the same through a relatively deep carbon filtering bed of highly heated ceramic pieces, with resultant production of hydrocarbon gas and deposition of carbon on the surfaces of the ceramic pieces which carbon is burned during a subsequent air blast period, the step of successively blasting air vertically in both directions through the bed between make periods, a first portion of air being blasted in one direction in controlled amount approximately sufficient to consume the carbon in the zone of the bed first contacted by the air, and a second portion of air being blasted through the bed in the opposite direction in amount sufficient to consume at least a major portion of the carbon remaining therein, thus rapidly heating the bed throughout its full depth to a high gas making temperature.

2. In a cyclic process for making combustible gas wherein during a gas make period hydrocarbons are cracked and carbon produced during cracking is separated from gas by passing the latter through a relatively deep carbon filtering bed of relatively small ceramic pieces, with resultant deposition of carbon on the surfaces of the ceramic pieces which carbon is burned during a subsequent blast period, the steps of blasting a combustion supporting gas vertically and successively in one direction through the ceramic bed and then in the opposite direction through the bed between make periods, and adjusting the amount of combustion supporting gas passed in each direction through the respective portions of the bed substantially in accordance with the amount of carbon held thereby.

3. In a cyclic process for making combustible gas wherein during a gas make period hydrocarbons are cracked by passing the same through a relatively deep carbon filtering bed of highly heated ceramic pieces, with resultant deposition of carbon on the surfaces of the ceramic pieces which carbon is burned during a subsequent air blast period, the steps of blasting air upwardly through the ceramic bed in amount approximately sufficient to consume the carbon deposited in the lowermost half of the bed during a preceding make period, withdrawing the resultant gases through the uppermost half of the bed, and thereafter discontinuing the upblast of air and passing air downwardly through the bed in amount sufficient to consume at least the major portion of the remaining carbon therein, thus rapidly heating each section of the bed to a uniform high gas making temperature.

4. In a cyclic process for making combustible gas wherein during a gas make period hydrocarbons are cracked by passing the same through a relatively deep carbon filtering bed of highly heated ceramic pieces, with resultant deposition of carbon on the surfaces of the ceramic pieces which carbon is burned during a subsequent air blast period, the steps of blasting air through the ceramic bed in successive upblast and downblast stages, and flowing air through the bed in each stage in amount adjusted substantially in accordance with the amount of carbon held in that portion of the bed first contacted thereby, thereby consuming the carbon carried by the bed and heating the latter to uniformly high gas making temperatures with the production of blast gases.

5. In a process of the type defined in claim 1, the additional steps of passing a controlled amount of steam through the ceramic bed following the blasting period and thereby generating water gas, and mixing the water gas thus produced with the gaseous product of the hydrocarbon cracking reaction.

6. In a process of the type defined in claim 1, the additional steps of burning gases produced during the blast period, utilizing the heat thus developed in vaporizing oil, and utilizing the vaporized oil to carburet gases produced during the make cycle.

7. In a process of the type defined in claim 1, the additional steps of burning a portion of the blast gases to supply heat for carrying on the gas making operation, and admixing a regulated unburned portion of the said blast gases with gas produced during the make period.

ALFRED JOHNSON.